(12) United States Patent
Ong

(10) Patent No.: US 7,435,766 B2
(45) Date of Patent: *Oct. 14, 2008

(54) METHOD OF DELIVERY OF AGENTS PROVIDING FREEZING AND THAWING RESISTANCE TO CEMENTITIOUS COMPOSITIONS

(75) Inventor: Frank Ong, Solon, OH (US)

(73) Assignee: Construction Research & Technology GmbH, Trostberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/452,048

(22) Filed: Jun. 13, 2006

(65) Prior Publication Data

US 2006/0281835 A1    Dec. 14, 2006

Related U.S. Application Data

(60) Provisional application No. 60/690,235, filed on Jun. 14, 2005.

(51) Int. Cl.
- C08K 7/16     (2006.01)
- C04B 24/10    (2006.01)
- C04B 24/24    (2006.01)

(52) U.S. Cl. .......................................... 523/223; 524/2
(58) Field of Classification Search ................. 523/223; 524/2
See application file for complete search history.

(56) References Cited

U.S. PATENT DOCUMENTS

| | | | |
|---|---|---|---|
| 2,797,201 A | 8/1957 | Veatch et al. |
| 3,272,765 A | 9/1966 | Sefton |
| 3,361,688 A | 1/1968 | Bonitz et al. |
| 3,591,394 A | 7/1971 | Diggelmann et al. |
| 3,804,058 A | 4/1974 | Messenger |
| 3,902,911 A | 9/1975 | Messenger |
| 4,057,526 A | 11/1977 | de Rook |
| 4,082,562 A | 4/1978 | Litvan et al. |
| 4,142,909 A | 3/1979 | Gaines |
| 4,234,344 A | 11/1980 | Tinsley et al. |
| 4,252,193 A | 2/1981 | Powers et al. |
| 4,303,736 A | 12/1981 | Torobin |
| 4,340,510 A | 7/1982 | Howanietz et al. |
| 4,367,093 A | 1/1983 | Burkhalter et al. |
| 4,427,836 A | 1/1984 | Kowalski et al. |
| 4,450,010 A | 5/1984 | Burkhalter et al. |
| 4,468,498 A | 8/1984 | Kowalski et al. |
| 4,594,363 A | 6/1986 | Blankenship et al. |
| 4,654,084 A | 3/1987 | Heinen |
| 5,188,889 A | 2/1993 | Nagatomi et al. |
| 5,508,313 A | 4/1996 | Delgado et al. |
| 5,571,318 A | 11/1996 | Griffith et al. |
| 5,728,209 A | 3/1998 | Bury et al. |
| 6,060,535 A | 5/2000 | Villar et al. |
| 6,485,560 B1 | 11/2002 | Scherer et al. |
| 6,508,305 B1 | 1/2003 | Brannon et al. |
| 6,572,697 B2 | 6/2003 | Gleeson et al. |
| 6,617,364 B2 | 9/2003 | Soane et al. |
| 6,626,991 B1 | 9/2003 | Drochon et al. |
| 6,722,434 B2 | 4/2004 | Reddy et al. |
| 2002/0035951 A1 | 3/2002 | Chatterji et al. |
| 2002/0117086 A1 | 8/2002 | Shi et al. |
| 2003/0110984 A1 | 6/2003 | Scherer et al. |
| 2003/0116064 A1 | 6/2003 | Danican et al. |
| 2003/0205172 A1 | 11/2003 | Gleeson et al. |
| 2003/0221831 A1 | 12/2003 | Reddy et al. |
| 2004/0147406 A1 | 7/2004 | Go Boncan |
| 2004/0168801 A1 | 9/2004 | Reddy et al. |
| 2004/0221990 A1 | 11/2004 | Heathman et al. |
| 2005/0098317 A1 | 5/2005 | Reddy et al. |
| 2005/0274285 A1 | 12/2005 | Christensen et al. |
| 2005/0274294 A1 | 12/2005 | Brower et al. |
| 2005/0284340 A1 | 12/2005 | Vickers et al. |
| 2006/0281836 A1 | 12/2006 | Kerns et al. |

FOREIGN PATENT DOCUMENTS

| | | |
|---|---|---|
| DE | 19 61 390 A1 | 6/1971 |
| EP | 0 022 633 B1 | 1/1981 |
| EP | 0 073 529 B1 | 3/1981 |
| EP | 0 118 325 B1 | 7/1986 |
| JP | 07-206505 A | 8/1995 |
| JP | 07-277794 | 10/1995 |
| JP | 08-059327 | 5/1996 |
| WO | WO-2004-007399 A | 1/2004 |

OTHER PUBLICATIONS

Betonwerk + Fertigteil-Technik—"A New Method of Making Concrete Resistant to Frost and De-Icing Salts" by Dr. Sommer; Sep. 1978.

Patent Abstracts of Japan, vol. 1996, No. 02, Feb. 29, 1996 & JP 07 277794 A (Kanegafuchi Chem Inc. Co. Ltd. Oct. 24, 1995.

Patent Abstracts of Japan, vol. 1999, No. 11, Sep. 30, 1999 & JP 11 147777 A (Kanegafuchi Chem Ind Do. Ltd., Jun. 2, 1999.

Patent Abstracts of Japan, vol. 1999, No. 14, Dec. 22, 1999 & JP 11 246253 A (Taisei Corp) Sep. 14, 1999.

Patent Abstracts of Japan, vol. 1996, No. 7, Jul. 31, 1996 & JP 08 059327 A (Hokkaido Kaihatsukyoku Doboku Kenkyusho Shin Etsu Chem Co. Ltd.

Internet Article, "PM 6550 Hollow Spheres" (www.sphereone.net/extendospheres/PM%206550%20PDS.pdf).

(Continued)

*Primary Examiner*—Elizabeth D Wood
(74) *Attorney, Agent, or Firm*—Curatolo Sidotico Co., LPA; Joseph G. Curatolo; Salvatore A. Sidoti

(57) ABSTRACT

A method of delivering an admixture providing freeze-thaw resistance to a cementitious composition is provided which includes the addition of a viscosity modifying admixture containing at least one of polymeric microspheres, at least partially degradable polymeric particles, or gas generating additives to cementitious compositions. The polymeric microspheres, at least partially degradable polymeric particles, and gas generating additives provide void spaces in the material matrix, and such void spaces act to increase freeze-thaw durability of the material.

44 Claims, No Drawings

OTHER PUBLICATIONS

Internet Brochure, Apr. 25, 2005, "EXPANCEL microspheres expand—and so does your profitability" (www.expancel.com/All_languages/about/files/EXPGEN002EN_Expancel%C2%AEMagic.pdf).

Patent Abstracts of Japan, vol. 2003, No. 02, Feb. 5, 2003 & JP 2002 294656 A (Life Stage Kigyo Kumiai, Oct. 9, 2002).

Patent Abstracts of Japan, vol. 1996, No. 09, Sep. 30, 1996 & JP 08 133799 A (Asahi Chem Ind Co Ltd; Toyo Sogo Kenkyusho:KK, May 28, 1996).

Patent Abstracts of Japan, vol. 2000, No. 03, Mar. 30, 2000 & JP 11 343182 A (Nichiha Corp, Dec. 14, 1999).

Patent Abstracts of Japan, vol. 014, No. 363 (C-0746), Aug. 7, 1990 & JP 02 1333357 A (Sumitomo Metal Ind Ltd, May 22, 1990).

METHOD OF DELIVERY OF AGENTS PROVIDING FREEZING AND THAWING RESISTANCE TO CEMENTITIOUS COMPOSITIONS

CROSS REFERENCE TO RELATED APPLICATIONS

This application claims the benefit of the filing date of U.S. Provisional Application for Patent Ser. No. 60/690,235 filed Jun. 14, 2005.

BACKGROUND

It is well known that freezing and thawing cycles can be extremely damaging to water-saturated hardened cement compositions such as concrete. The best known technique to prevent or reduce the damage done is the incorporation in the composition of microscopically fine pores or voids. The pores or voids function as internal expansion chambers and can therefore protect the concrete from frost damage by relieving the hydraulic pressure caused by an advancing freezing front in the concrete. The method used in the prior art for artificially producing such voids in concrete has been by means of air-entraining agents, which stabilize tiny bubbles of air that are entrapped in the concrete during mixing.

These air voids are typically stabilized by use of surfactants during the mixing process of wet cast concrete. Unfortunately, this approach of entraining air voids in concrete is plagued by a number of production and placement issues, some of which are the following:

Air Content—Changes in air content of the cementitious mixture can result in concrete with poor resistance to freezing and thawing distress if the air content drops with time or reduce the compressive strength of concrete if the air content increases with time. Examples are pumping concrete (decrease air content by compression), job-site addition of a superplasticizer (often elevates air content or destabilizes the air void system), interaction of specific admixtures with the air-entraining surfactant (could increase or decrease air content).

Air Void Stabilization: The inability to stabilize air bubbles can be due to the presence of materials that adsorb the stabilizing surfactant, i.e., fly ash with high surface area carbon or insufficient water for the surfactant to work properly, i.e, low slump concrete.

Air Void Characteristics: Formation of bubbles that are too large to provide resistance to freezing and thawing, can be the result of poor quality or poorly graded aggregates, use of other admixtures that destabilize the bubbles, etc. Such voids are often unstable and tend to float to the surface of the fresh concrete.

Overfinishing: Removal of air by overfinishing, removes air from the surface of the concrete, typically resulting in distress by scaling of the detrained zone of cement paste adjacent to the overfinished surface.

The generation and stabilization of air at the time of mixing and ensuring it remains at the appropriate amount and air void size until the concrete hardens are the largest day-to-day challenges for the ready mix concrete producer in North America.

Adequately air-entrained concrete remains one of the most difficult types of concrete to make. The air content and the characteristics of the air void system entrained into the concrete cannot be controlled by direct quantitative means, but only indirectly through the amount/type of air-entraining agent added to the mixture. Factors such as the composition and particle shape of the aggregates, the type and quantity of cement in the mix, the consistency of the concrete, the type of mixer used, the mixing time, and the temperature all influence the performance of the air-entraining agent. The void size distribution in ordinary air-entrained concrete can show a very wide range of variation, between 10 and 3,000 micrometers ($\mu m$) or more. In such concrete, besides the small voids which are essential to cyclic freeze-thaw resistance, the presence of larger voids—which contribute little to the durability of the concrete and could reduce the strength of the concrete—has to be accepted as an unavoidable feature.

The characteristics of an air void system in hardened concrete are determined by means of ASTM C457 Standard Test method for Microscopical Determination of Parameters of the Air-Void System in Hardened concrete. These characteristics are expressed as a series of parameters that are indicative of the average voids size (specific surface area), volumetric abundance (air content) and average distance between the voids (spacing factor). These values have been used in the concrete industry to determine the expected performance and durability of concrete in a water-saturated cyclic freezing environment. ACI guidelines recommend that the specific area be greater than 600 $in^{-1}$ and the spacing factor equal to or less than 0.008 in to ensure resistance to freezing and thawing cycles.

Those skilled in the art have learned to control for these influences by the application of appropriate rules for making air-entrained concrete. The making of such concrete requires the exercise of particular care. Specifically, the air content must be checked regularly. If the air content is too low, the front resistance of the concrete will be inadequate. But, if the air content is too high, the compressive strength will be adversely affected.

The methods for controlling air voids in the prior art often result in inconsistent performance. If air bubbles of acceptable size and spacing are not entrained by the action of mixing, then no amount of bubble stabilizing chemical systems can produce an acceptable air void structure in the hardened concrete.

Therefore, it is desirable to provide an admixture which produces a freeze-thaw durable void structure directly in a wet cast cementitious mixture, without requiring the shear conditions for generation of properly sized air bubbles during mixing. The void structures may comprise optimally sized voids to the wet cast mixture that provide the cementitious composition with improved freeze-thaw durability. The admixture should also reduce or eliminate the reduction of compressive strength for products manufactured from wet cast mixtures containing conventional air-entraining chemical admixtures.

SUMMARY

A method of delivering an admixture providing freeze-thaw resistance to a cementitious composition is provided which comprises adding to the cementitious composition a viscosity modifying admixture containing at least one of polymeric microspheres, at least partially degradeable polymeric particles, gas generating additive, or mixtures thereof wherein the viscosity modifying admixture containing at least one of polymeric microspheres, at least partially degradable polymeric particles or gas generating additive is added as a single admixture to the cementitious composition.

A non-conventional frost durability admixture is provided which comprises a viscosity modifying admixture containing at least one of polymeric microspheres at least partially degradable polymeric particles, gas generating additive, or mixtures thereof.

A method of delivering an admixture providing freeze-thaw resistance to a cementitious composition is provided, comprising adding to the cementitious composition a viscosity modifying admixture containing at least one of polymeric microspheres, at least partially degradable polymeric particles, or mixtures thereof, wherein the viscosity modifying admixture containing the polymeric microspheres or the degradable polymer particles is added as a single admixture to the cementitious composition.

A non-conventional frost durability admixture is provided, comprising a viscosity modifying admixture containing at least one of polymeric microspheres, at least partially degradable polymeric particles, or mixtures thereof.

A method of delivering an admixture providing freeze-thaw resistance to a cementitious composition is provided, comprising adding to the cementitious composition a viscosity modifying admixture containing a gas generating additive, wherein the viscosity modifying admixture containing the gas generating additive is added as a single admixture to the cementitious composition.

A non-conventional frost durability admixture is provided, comprising a viscosity modifying admixture containing a gas generating additive.

DETAILED DESCRIPTION

A method of delivery of agents providing freeze-thaw resistance to a cementitious composition is provided which comprises the addition of polymeric microspheres, at least partially degradable polymeric particles, and/or gas generating additives to cementitious compositions using a viscosity modifying admixture as a liquid vehicle for them. Non-conventional agents for front durability such as microspheres or gas generators are supplied in the form of dry powders that are not easy to use. They are typically added to cementitious compositions in small amounts, and homogeneously distributing them throughout the cementitious composition can be difficult. Delivering such non-conventional frost durability agents as liquid dispersions in a viscosity modifying admixture provides for much more manageable handling and dispensing of the microspheres and gas generators, particularly those having a density differing from the density of water (higher or lower).

The use of a viscosity modifying admixture allows the user to dose polymeric microspheres, polymeric particles and/or gas generators more easily and reproducibly.

Microspheres and other low density solids are very difficult to use as their low density results in easy airborne dispersion. Delivery of these materials as a stable liquid dispersion in a viscosity modifying admixture provides for easier handling of the polymeric microspheres, degradable particles and gas generators.

A non-conventional frost durability agent, such as polymeric microspheres, degradable polymeric particles, or gas generators, is dispersed in a viscosity modifying admixture such as a high molecular weight polymeric solution which may be comprised of celluloses such as hydroxyethyl cellulose or hydroxypropyl cellulose; polyethylene glycols; or polysaccharides such as an aqueous diutan gum solution, or aqueous welan gum solution, by high shear mixing. The materials are wetted out by low shear mixing and then thoroughly dispersed by high shear mixing for at least about two minutes. The concentration of the dispersion can be up to as high as about 30 to about 40 percent solids by weight. The concentration is mainly determined by the desire to achieve as concentrated a dispersion as possible while maintaining a pourable viscosity. Dispersions made in this way, at 20% solids, have shown stability for over one year. Use of the dispersions in cementitious systems has shown improved workability, as manifested by higher slump and easier placement.

A method for introducing non-conventional frost durability agents such as polymeric microspheres, degradable polymeric particles and gas generators is provided. The method uses viscosity modifying admixtures to add gas or liquid filled polymeric microspheres, degradable polymeric particles and/or an added chemical or blend of chemicals that generates gas when dispersed into the cementitious mixture. The polymeric microspheres are produced and marketed under a variety of trade names and use a variety of polymeric materials to form the wall of the particle.

The use of polymeric microspheres, degradable polymeric particles, and/or gas generators substantially eliminates most of the problems in the current art. Degradable polymeric particles include fully degradable particles and at least partially degradable particles. By partially degradable, it is meant that a portion of the particle structure may not be susceptible to hydrolytic degradation, thus leaving a partially filled cavity. It also makes it possible to use some materials, i.e., low grade, high-carbon fly ash, which are currently landfilled as they are not usable in conventionally air-entrained concrete without further treatment. This results in cement savings, and therefore economic savings.

The cementitious composition in which the present admixture is used will generally be exposed to the environment, that is, the cementitious composition will be placed in an environment exposed to weathering, and freeze thaw cycling.

The polymeric microspheres, degradable polymeric particles and gas generated by the gas generators provide void spaces in the cementitious material matrix prior to final setting, and such void spaces act to increase the freeze-thaw durability of the cementitious material. Polymeric microspheres, degradable polymeric particles and in-situ gas generation introduces voids into the wet cast cementitious composition to produce a fully formed void structure in the concrete that resists degradation produced by freeze-thaw cycles and does not rely on air bubble stabilization during mixing of the wet cast cementitious composition. The freeze-thaw durability enhancement produced by in-situ gas generation and polymeric microspheres or degradable polymeric particles is based on a physical mechanism for relieving stresses produced when water freezes in a cementitious material. In conventional practice, properly sized and spaced voids are generated in the hardened material by using chemical admixtures to stabilize the air voids entrained to a concrete mixture during mixing. In conventional concrete mixtures these chemical admixtures as a class are called air entraining agents.

The hydraulic cement can be a Portland cement, a calcium aluminate cement, a magnesium phosphate cement, a magnesium potassium phosphate cement, a calcium sulfoaluminate cement or any other suitable hydraulic binder. Aggregate may be included in the cementitious wet cast mixture. The aggregate can be silica, quartz, sand, crushed marble, glass spheres, granite, limestone, calcite, feldspar, alluvial sands, any other durable aggregate, and mixtures thereof.

The use of aluminum powder was historically one of the means of producing gas bubbles in cementitious systems. There are a number of advantages to using gas generators other than aluminum powder. The first is the formation of nonflammable gases such as nitrogen or carbon dioxide instead of hydrogen gas (formed by reaction of aluminum powder with water at alkaline pH). The second is that the particles of aluminum powder are generally larger than many gas generator powders, and they generate bubbles that are larger and tend to burrow channels into the structure. As a result, aluminum powder does not always produce a good bubble structure in the hardened concrete system for purposes of resistance to freezing and thawing. The third advantage is that the reaction of aluminum powder is highly temperature dependent, unlike the decomposition pathways of most gas generators.

The gas generating additives may be added to cementitious compositions in the amount of about 0.005 percent to about 2 percent solid by weight of dry cement. The gas generating additives are any compound that generates nitrogen, oxygen, hydrogen, carbon dioxide, carbon monoxide, ammonia, or methane gas and come from a large range of chemistries, for example nitrogen gas generating compounds such as hydrazine, hydrazide, azide, azo compounds, azodicarbonamides, toluene sulfonylhydrazide, benzenesulfonyl hydrazide, toluenesulfonyl acetone hydrazone, toluene sulfonylsemicarbazide, phenyltetrazole, dinitroso-pentamethylenetetramine; hydrogen gas generating compounds such as sodium borohydride; oxygen gas generating compounds such as organic peroxide and inorganic peroxide; carbon dioxide generating compounds such as sodium bicarbonate or other alkali metal or alkaline earth carbonates; and air generating compounds such as activated carbon. An example of a hydrazide is 4,4"-oxydibenzenesulfonyl hydrazide. Some of the attributes of 4,4"-oxydibenzenesulfonyl hydrazide are that it decomposes after the cementitious composition is in place and it is relatively insoluble in water; consequently it is not significantly affected by mechanical action during transport. This material has historically been used to provide some expansive offset to the chemical shrinkage in mortars and grouts, but has not been used in a method to reduce damage done to cementitious compositions exposed to freeze-thaw cycles.

The polymeric microspheres are of an average diameter of about 100 micrometers or less, and in certain embodiments with an average diameter of about 25 micrometers or less, and in other embodiments with an average diameter of about 10 micrometers or less. The polymeric microspheres may have a hollow core and compressible wall. The interior portion of the polymeric microspheres comprises a void cavity or cavities that may contain gas (gas filled) or liquid (liquid filled).

The polymeric microspheres may be comprised of a polymer that is at least one of polyethylene, polypropylene, polymethyl methacrylate, poly-o-chlorostyrene, polyvinyl chloride, polyvinylidene chloride, polyacrylonitrile, polymethacrylonitrile, polystyrene, and copolymers thereof, such as copolymers of vinylidene chloride-acrylonitrile, polyacrylonitrile-copolymethacrylonitrile, polyvinylidene chloride-polyacrylonitrile, or vinyl chloride-vinylidene chloride, and the like. As the polymeric microspheres are composed of polymers, the wall is flexible, such that it moves in response to pressure. This is in comparison to glass, ceramic or other inflexible materials which produce microspheres with rigid structures that fracture when exposed to pressure. The material from which the polymeric microspheres are to be made, therefore, is flexible, and resistant to the alkaline environment of cementitious compositions.

Additionally the microspheres or other degradable polymeric particles may be comprised of degradable polymers. While not intending to be limited by theory, the degradable polymers are unstable in highly alkaline environments (as would be found in cementitious compositions) and degrade over a period of hours, days, or weeks to leave a void. The degradable polymeric microspheres and particles are also susceptible to degradation by enzymes and bacteria, as well as catalysis by transition metals present in the cementitious composition. The void spaces are therefore created during the hydration process, during set, and further after the cementitious composition has hardened. The degradable polymeric microsphere particles may have a hollow core and compressible wall. The interior portion of the degradable polymeric microspheres or particles may comprise a void cavity or cavities that may contain gas (gas filled) or liquid (liquid filled).

The degradable polymers may be comprised of a polyester or polylactone polymer. In other some embodiments the polyester may comprise polylactic acid, polyglycolic acid, or copolymers or mixtures thereof, for example but not for limitation such as copolymers of polylactic acid-polylactic acid, polyglycolic acid-polyglycolic acid, and polylactic acid-polyglycolic acid, lactide-caprolactone, lactide-ethylene oxide, lactide-cyclic carbonate, lactide derived poly(ester amides), and poly(L-lactide-co-D-lactide). Additionally, in certain embodiments in which the microspheres or particles comprise polylactic acid, copolymers of polylactic acid, or mixtures of polylactic acid, as the microspheres or particles are degraded in the cementitious composition, lactic acid is produced which is a known strength enhancer. As the polymeric particles are composed of polymers, the wall is flexible, such that it moves in response to pressure. This is in comparison to glass, ceramic or other inflexible materials which produce microspheres with rigid structures that fracture when exposed to pressure.

In certain embodiments the dimensions of the microspheres or degradable polymeric particles would be those that are smaller than about 10 µm in average diameter. The smaller the diameter of the polymeric microspheres or particles, the less that is required to achieve the desired spacing factor (which is a predictor of resistance to freezing and thawing). This is beneficial from a performance perspective, in that less of a decrease in compressive strength occurs by their addition, as well as an economic perspective, since a less mass of spheres is required. Similarly, the wall thickness of the polymeric microspheres should be as thin as possible, to minimize material cost, but thick enough to resist damage/fracture during the cementitious composition mixing, placing, consolidating and finishing processes.

The amount of polymeric microspheres or degradable polymeric particles to be added to the cementitious composition is about 0.05 percent to 4 percent of total volume or about 0.01 percent by weight of dry cement to about 4 percent by weight of dry cement.

An admixture composition produced by the method described herein may contain other additives or ingredients and should not be limited to the stated formulations. Additives that can be added include, but are not limited to: dispersants, set and strength accelerators/enhancers, set retarders, water reducers, corrosion inhibitors, wetting agents, water soluble polymers, rheology modifying agents, water repellents, non degrading fibers, dampproofing admixtures, permeability reducers, fungicidal admixtures, germicidal admixtures, insecticide admixtures, alkali-reactivity reducer, bonding admixtures, shrinkage reducing admixtures, and any other admixture or additive that does not adversely affect the properties of a cementitious composition. The cementitious composition need not contain one of each of the foregoing additives.

A cementitious composition provided by the method described herein may contain other additives or ingredients and should not be limited to the stated formulations. Cement additives that can be added include, but are not limited to: air entrainers, aggregates, pozzolans, dispersants, set and strength accelerators/enhancers, set retarders, water reducers, corrosion inhibitors, wetting agents, water soluble polymers, rheology modifying agents, water repellents, fibers, damp-proofing admixtures, permeability reducers, fungicidal admixtures, germicidal admixtures, insecticide admixtures, finely divided mineral admixtures, alkali-reactivity reducer, bonding admixtures, shrinkage reducing admixtures, and any other admixture or additive that does not adversely affect the properties of the cementitious composition. The cementitious composition need not contain one of each of the foregoing additives.

Aggregate can be included in the cementitious formulation to provide for mortars which include fine aggregate, and concretes which also include coarse aggregate. The fine aggregate are materials that almost entirely pass through a Number 4 sieve (ASTM C 125 and ASTM C 33), such as silica sand. The coarse aggregate are materials that are predominantly retained on a Number 4 sieve (ASTM C 125 and ASTM C 33), such as silica, quartz, crushed marble, glass spheres, granite, limestone, calcite, feldspar, alluvial sands, sands or any other durable aggregate, and mixtures thereof.

A pozzolan is a siliceous or aluminosiliceous material that possesses little or no cementitious value but will, in the presence of water and in finely divided form, chemically react with the calcium hydroxide produced during the hydration of Portland cement to form materials with cementitious properties. Diatomaceous earth, opaline cherts, clays, shales, fly ash, slag, silica fume, volcanic tuffs and pumicites are some of the known pozzolans. Certain ground granulated blast-furnace slags and high calcium fly ashes possess both pozzolanic and cementitious properties. Natural pozzolan is a term of art used to define the pozzolans that occur in nature, such as volcanic tuffs, pumices, trasses, diatomaceous earths, opaline, cherts, and some shales. Nominally inert materials can also include finely divided raw quartz, dolomites, limestones, marble, granite, and others. Fly ash is defined in ASTM C618.

If used, silica fume can be uncompacted or can be partially compacted or added as a slurry. Silica fume additionally reacts with the hydration byproducts of the cement binder, which provides for increased strength of the finished articles and decreases the permeability of the finished articles. The silica fume, or other pozzolans such as fly ash or calcined clay such as metakaolin, can be added to the cementitious wet cast mixture in an amount from about 5% to about 70% based on the weight of cementitious material.

A dispersant if used can be any suitable dispersant such as lignosulfonates, beta naphthalene sulfonates, sulfonated melamine formaldehyde condensates, polyaspartates, polycarboxylates with and without polyether units, naphthalene sulfonate formaldehyde condensate resins, for example LOMAR D® dispersant (Cognis Inc., Cincinnati, Ohio), or oligomeric dispersants.

Polycarboxylate dispersants can be used, by which is meant a dispersant having a carbon backbone with pendant side chains, wherein at least a portion of the side chains are attached to the backbone through a carboxyl group or an ether group. The term dispersant is also meant to include those chemicals that also function as a plasticizer, high range water reducer, fluidizer, antiflocculating agent, or superplasticizer for cementitious compositions. Examples of polycarboxylate dispersants can be found in U.S. Pub. No. 2002/0019459 A1, U.S. Pat. Nos. 6,267,814, 6,290,770, 6,310,143, 6,187,841, 5,158,996, 6,008,275, 6,136,950, 6,284,867, 5,609,681, 5,494,516; 5,674,929, 5,660,626, 5,668,195, 5,661,206, 5,358,566, 5,162,402, 5,798,425, 5,612,396, 6,063,184, and 5,912,284, 5,840,114, 5,753,744, 5,728,207, 5,725,657, 5,703,174, 5,665,158, 5,643,978, 5,633,298, 5,583,183, and 5,393,343, which are all incorporated herein by reference, as if fully written out below.

The term oligomeric dispersant refers to oligomers that are a reaction product of: component A, optionally component B, and component C; wherein each component A is independently a nonpolymeric, functional moiety that adsorbs onto a cementitious particle; wherein component B is an optional moiety, where if present, each component B is independently a nonpolymeric moiety that is disposed between the component A moiety and the component C moiety; and wherein component C is at least one moiety that is a linear or branched water soluble, nonionic polymer substantially non-adsorbing to cement particles. Oligomeric dispersants are disclosed in U.S. Pat. Nos. 6,133,347, 6,492,461, and 6,451,881, which are hereby incorporated by reference, as if fully written out below.

Set and strength accelerators/enhancers that can be used include, but are not limited to, a nitrate salt of an alkali metal, alkaline earth metal, or aluminum; a nitrite salt of an alkali metal, alkaline earth metal, or aluminum; a thiocyanate of an alkali metal, alkaline earth metal or aluminum; an alkanolamine; a thiosulphate of an alkali metal, alkaline earth metal, or aluminum; a hydroxide of an alkali metal, alkaline earth metal, or aluminum; a carboxylic acid salt of an alkali metal, alkaline earth metal, or aluminum (preferably calcium formate); a polyhydroxylalkylamine; a halide salt of an alkali metal or alkaline earth metal (preferably bromide), Examples of accelerators that can be used include, but are not limited to, POZZOLITH® NC534, non chloride type accelerator and/or RHEOCRETE® CNI calcium nitrite-based corrosion inhibitor both sold under the trademarks by Degussa Admixtures, Inc. of Cleveland, Ohio.

The salts of nitric acid have the general formula $M(NO_3)_a$ where M is an alkali metal, or an alkaline earth metal or aluminum, and where a is 1 for alkali metal salts, 2 for alkaline earth salts, and 3 for aluminum salts. Preferred are nitric acid salts of Na, K, Mg, Ca and Al.

Nitrite salts have the general formula $M(NO2)_a$ where M is an alkali metal, or an alkaline earth metal or aluminum, and where a is 1 for alkali metal salts, 2 for alkaline earth salts, and 3 for aluminum salts. Preferred are nitric acid salts of Na, K, Mg, Ca and Al.

The salts of the thiocyanic acid have the general formula $M(SCN)_b$, where M is an alkali metal, or an alkaline earth metal or aluminum, and where b is 1 for alkali metal salts, 2 for alkaline earth salts and 3 for aluminum salts. These salts are variously known as sulfocyanates, sulfocyanides, rhodanates or rhodanide salts. Preferred are thiocyanic acid salts of Na, K, Mg, Ca and Al.

Alkanolamine is a generic term for a group of compounds in which trivalent nitrogen is attached directly to a carbon atom of an alkyl alcohol. A representative formula is $N[H]_c[(CH_2)_d CHRCH_2R]_e$, where R is independently H or OH, c is 3-e, d is 0 to about 4 and e is 1 to about 3. Examples include, but are not limited to, are monoethanoalamine, diethanolamine, triethanolamine and triisopropanolamine.

The thiosulfate salts have the general formula $M_f(S_2O_3)_g$ where M is alkali metal or an alkaline earth metal or aluminum, and f is 1 or 2 and g is 1, 2 or 3, depending on the valencies of the M metal elements. Preferred are thiosulfate acid salts of Na, K, Mg, Ca and Al.

The carboxylic acid salts have the general formula RCOOM wherein R is H or $C_1$ to about $C_{10}$ alkyl, and M is alkali metal or an alkaline earth metal or aluminum. Preferred are carboxylic acid salts of Na, K, Mg, Ca and Al. An example of carboxylic acid salt is calcium formate.

A polyhydroxyalkylamine can have the general formula

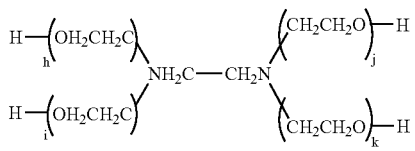

wherein h is 1 to 3, I is 1 to 3, j is 1 to 3, and k is 0 to 3. A preferred polyhydroxyalkylamine is tetrahydroxyethylethylenediamine.

Set retarding, or also known as delayed-setting or hydration control, admixtures are used to retard, delay, or slow the rate of setting of cementitious compositions. Set retarders are used to offset the accelerating effect of hot weather on the setting of cementitious compositions, or delay the initial set of cementitious compositions when difficult conditions of placement occur, or problems of delivery to the job site, or to allow time for special finishing processes. Most set retarders also act as low level water reducers and can also be used to entrain some air into cementitious compositions. Lignosulfonates, hydroxylated carboxylic acids, borax, gluconic, tartaric and other organic acids and their corresponding salts, phosphonates, certain carbohydrates such as sugars, polysaccharides and sugar-acids and mixtures thereof can be used as retarding admixtures.

Corrosion inhibitors serve to protect embedded reinforcing steel from corrosion. The high alkaline nature of cementitious compositions causes a passive and non-corroding protective oxide film to form on the steel. However, carbonation or the presence of chloride ions from deicers or seawater, together with oxygen can destroy or penetrate the film and result in corrosion. Corrosion-inhibiting admixtures chemically slow this corrosion reaction. The materials most commonly used to inhibit corrosion are calcium nitrite, sodium nitrite, sodium benzoate, certain phosphates or fluorosilicates, fluoroaluminates, amines, organic based water repelling agents, and related chemicals.

In the construction field, many methods of protecting cementitious compositions from tensile stresses and subsequent cracking have been developed through the years. One modern method involves distributing fibers throughout a fresh cementitious mixture. Upon hardening, this cementitious composition is referred to as fiber-reinforced cement. Fibers can be made of zirconium materials, carbon, steel, fiberglass, or synthetic materials, e.g., polypropylene, nylon, polyethylene, polyester, rayon, high-strength aramid, or mixtures thereof.

Dampproofing admixtures reduce the permeability of concrete that has low cement contents, high water-cement ratios, or a deficiency of fines in the aggregate portion. These admixtures retard moisture penetration into wet concrete and include certain soaps, stearates, and petroleum products.

Permeability reducers are used to reduce the rate at which water under pressure is transmitted through cementitious compositions. Silica fume, fly ash, ground slag, metakaolin, natural pozzolans, water reducers, and latex can be employed to decrease the permeability of the cementitious compositions.

Bacteria and fungal growth on or in hardened cementitious compositions may be partially controlled through the use of fungicidal, germicidal, and insecticidal admixtures. The most effective materials for these purposes are polyhalogenated phenols, dialdrin emulsions, and copper compounds.

Coloring admixtures are usually composed of pigments, either organic such as phthalocyanine or inorganic pigments such as metal-containing pigments that comprise, but are not limited to metal oxides and others, and can include, but are not limited to, iron oxide containing pigments such as CHROMIX®L (Degussa Admixtures, Inc. Cleveland Ohio), chromium oxide, aluminum oxide, lead chromate, titanium oxide, zinc white, zinc oxide, zinc sulfide, lead white, iron manganese black, cobalt green, manganese blue, manganese violet, cadmium sulfoselenide, chromium orange, nickel titanium yellow, chromium titanium yellow, cadmium sulfide, zinc yellow, ultramarine blue and cobalt blue.

Alkali-reactivity reducers can reduce the alkali-aggregate reaction and limit the disruptive expansion forces that this reaction can produce in hardened cementitious compositions. Pozzolans (fly ash, silica fume), blast-furnace slag, salts of lithium and barium are especially effective.

The shrinkage reducing agent which can be used comprises but is not limited to $RO(AO)_{1-10}H$, wherein R is a $C_{1-5}$ alkyl or $C_{5-6}$ cycloalkyl radical and A is a $C_{2-3}$ alkylene radical, alkali metal sulfate, alkaline earth metal sulfates, alkaline earth oxides, preferably sodium sulfate and calcium oxide. TETRAGUARD® admixture is an example of a shrinkage reducing agent (available from Degussa Admixtures, Inc. of Cleveland, Ohio) that can be used.

In one embodiment a method of providing freeze-thaw resistance to a cementitious composition comprises adding to the cementitious composition a viscosity modifying admixture containing at least one of polymeric microspheres, degradable polymeric particles, gas generating additive, or mixtures thereof. The polymeric microspheres may be gas-filled or liquid-filled. Further the polymeric microspheres may comprise at least one of polyethylene, polypropylene, polymethyl methacrylate, poly-o-chlorostyrene, polyvinyl chloride, polyvinylidene chloride, polyacrylonitrile, polymethacrylonitrile, polystyrene, or copolymers or mixtures thereof, for example but not for limitation such as copolymers of vinylidene chloride-acrylonitrile, polyacrylonitrile-copolymethacrylonitrile, polyvinylidene chloride-copolyacrylonitrile, or vinyl chloride-vinylidene chloride. In another embodiment the degradable polymers may be comprised of a polyester or polylactone polymer. In other some embodiments the polyester may comprise polylactic acid, polyglycolic acid, or copolymers or mixtures thereof, for example but not for limitation such as copolymers of polylactic acid-polylactic acid, polyglycolic acid-polyglycolic acid, and polylactic acid-polyglycolic acid, lactide-caprolactone, lactide-ethylene oxide, lactide-cyclic carbonate, lactide derived poly(ester amides), and poly(L-lactide-co-D-lactide). In certain embodiments the viscosity modifying admixture comprises a high molecular weight polymeric solution which may be comprised of celluloses such as hydroxyethyl cellulose or hydroxypropyl cellulose; polyethylene glycols; or polysaccharides such as an aqueous diutan gum solution or aqueous welan gum solution. In certain other embodiments the gas generating additive may be a hydrazide.

In another embodiment the method of providing freeze-thaw resistance to a cementitious composition comprises at least one of the following characteristics: the gas generating additive is added in a range from about 0.005 percent to about 5 percent by weight of dry cement; the polymeric microspheres or degradable polymer paraticles are added in a range from about 0.01 percent to about 4 percent by weight of dry cement.

In one embodiment a non-conventional frost durability admixture is provided which comprises a viscosity modifying admixture containing at least one of polymeric microspheres, at least partially degradable polymeric particles, or gas generating additive. The viscosity modifying admixture may comprise a high molecular weight polymeric solution which may be comprised of celluloses such as hydroxyethyl cellulose or hydroxypropyl cellulose; polyethylene glycols; or polysaccharides such as an aqueous diutan gum solution, or aqueous welan gum solution. In certain embodiments the polymeric microspheres may comprise a polymer that is at least one of polyethylene, polypropylene, polymethyl methacrylate, poly-o-chlorostyrene, polyvinyl chloride, polyvinylidene chloride, polyacrylonitrile, polymethacrylonitrile, polystyrene, or copolymers, or mixtures thereof. In another embodiment the degradable polymers may be comprised of a polyester or polylactone polymer. In other some embodiments the polyester may comprise polylactic acid, polyglycolic acid, or copolymers or mixtures thereof, for example but not for limitation such as copolymers of polylactic acid-polylactic acid, polyglycolic acid-polyglycolic acid, and polylactic acid-polyglycolic acid, lactide-caprolactone, lactide-ethylene oxide, lactide-cyclic carbonate, lactide derived poly(ester amides), and poly(L-lactide-co-D-lactide). In other embodiments the gas generating additive may comprise a compound that generates nitrogen, oxygen, hydrogen, carbon dioxide, carbon monoxide, ammonia, or methane gas in the cementitious composition prior to setting.

EXAMPLES

Admixture Formulation of Viscosity Modifier with Gas Generator

A commercially available viscosity modifier was high-shear blended with a known amount of azodicarbonamide for 3-5 minutes to provide a smooth, homogeneous admixture.

| Sample | Viscosity modifier (Kg) | Azodicarbonamide (gm) |
|---|---|---|
| Formulation A | 4.050 | 385 |
| Formulation B | 4.050 | 577 |

During blending, the walls of the blending vessel were occasionally scraped down to ensure complete dispersion of the solids into the viscosity modifier. The resultant dispersions were free-flowing and bright yellow in color. They were stored for one week at room temperature before being used in the field.

Admixture Formulation of Viscosity Modifier with Microspheres

A commercially available aqueous microsphere dispersion was high-shear blended with a known amount of diutan gum to provide a smooth, homogeneous admixture. The diutan gum powder was added in several additions.

| Sample | Diutan gum (gm) | Microsphere dispersion (Kg) |
|---|---|---|
| Formulation A | 16.6 | 4.512 |
| Formulation B | 16.6 | 13.536 |

The blending vessel walls and the blending rotor head itself were scraped down frequently to ensure complete dispersion of the diutan gum. The mixture was well homogenized before each subsequent addition. The entire addition and blending process took approximately 20-25 minutes. The resultant dispersions were thick, pourable, and white in color. They were stored at room temperature for up to one week before being used in the field.

It will be understood that the embodiments described herein are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

I claim:

1. A method of delivering an admixture providing freeze-thaw resistance to a cementitious composition comprising adding to the cementitious composition a viscosity modifying admixture comprising a high molecular weight polymeric solution of polyethylene glycols, polysaccharides, or mixtures thereof, containing polymeric microspheres, wherein the viscosity modifying admixture containing the polymeric microspheres is added as a single admixture to the cementitious composition.

2. The method of claim 1 wherein the viscosity modifying admixture comprises a polysaccharide that is at least one of an aqueous diutan gum solution, aqueous welan gum solution, or mixtures thereof.

3. The method of claim 1 wherein the polymeric microspheres comprise a polymer that is at least one of polyethylene, polypropylene, polymethyl methacrylate, poly-o-chlorostyrene, polyvinyl chloride, polyvinylidene chloride, polyacrylonitrile, polymethacrylonitrile, polystyrene, copolymers, or mixtures thereof.

4. The method of claim 1 wherein the polymeric microspheres comprise at least one copolymer of vinylidene chloride-acrylonitrile, polyvinylidene chloride-copolyacrylonitrile, polyacrylonitrile-copolymethacrylonitrile, vinyl chloride-vinylidene chloride, or mixtures thereof.

5. The method of claim 1 wherein the polymeric microspheres have an average diameter of about 100 μm or less.

6. The method of claim 1 wherein the polymeric microspheres have an average diameter of about 10 μm or less.

7. The method of claim 1 wherein the polymeric microspheres are at least one of gas filled or liquid filled.

8. A frost durability admixture comprising a viscosity modifying admixture comprising a high molecular weight polymeric solution of polyethylene glycols, polysaccharides, or mixtures thereof containing polymeric microspheres.

9. The admixture of claim 8 wherein the viscosity modifying admixture comprises a polysaccharide that is at least one of an aqueous diutan gum solution, aqueous welan gum solution, or mixtures thereof.

10. The admixture of claim 8 wherein the polymeric microspheres comprise a polymer that is at least one of polyethylene, polypropylene, polymethyl methacrylate, poly-o-chlorostyrene, polyvinyl chloride, polyvinylidene chloride, polyacrylonitrile, polymethacrylonitrile, polystyrene, copolymers, or mixtures thereof.

11. The admixture of claim 8 wherein the polymeric microspheres comprise at least one copolymer of vinylidene chloride-acrylonitrile, polyvinylidene chloride-copolyacrylonitrile, polyacrylonitrile-copolymethacrylonitrile, vinyl chloride-vinylidene chloride, or mixtures thereof.

12. The admixture of claim 8 wherein the polymeric microspheres have an average diameter of about 100 μm or less.

13. The admixture of claim 8 wherein the polymeric microspheres are at least one of gas filled or liquid filled.

14. A cementitious composition produced by the method of claim 1.

15. A method of delivering an admixture providing freeze-thaw resistance to a cementitious composition comprising adding to the cementitious composition a viscosity modifying admixture comprising a high molecular weight polymeric solution containing a gas generating additive, wherein the viscosity modifying admixture containing the gas generating additive is added as a single admixture to the cementitious composition.

16. The method of claim 15 wherein the viscosity modifying admixture comprises at least one of celluloses, polyethylene glycols, polysaccharides, or mixtures thereof.

17. The method of claim 16 wherein the viscosity modifying admixture comprises a polysaccharide that is at least one of an aqueous diutan gum solution, aqueous welan gum solution, or mixtures thereof.

18. The method of claim 16 wherein the viscosity modifying admixture comprises a cellulose that is at least one of a hydroxyethyl cellulose, hydroxypropyl cellulose, or mixtures thereof.

19. The method of claim 15 wherein the gas generating additive comprises a compound that generates nitrogen, oxygen, hydrogen, carbon dioxide, carbon monoxide, ammoma, or methane gas in the cementitious composition prior to setting.

20. The method of claim 15 wherein the gas generating additive is at least one of a hydrazide, hydrazine, azide, or azo compound.

21. The method of claim 15 wherein the gas generating additive is at least one of azodicarbonaminde, sodium, bicarbonate, organic peroxide, inorganic peroxide, toluenesulfonylhydrazide, benzenesulfonyl hydrazide, toluenesulfonyl acetone hydrazone, toluesulfonylsemicarbazide, phenyltetrazole, sodium borohydride, activated carbon, dinitroso-pentamethylenetetramine, or mixtures thereof.

22. A frost durability admixture comprising a viscosity modifying admixture comprising a high molecular weight polymeric solution containing a gas generating additive.

23. The admixture of claim 22 wherein the viscosity modifying admixture comprises at least one of celluloses, polyethylene glycols, polysaccharides, or mixtures thereof.

24. The admixture of claim 23 wherein the viscosity modifying admixture comprises a polysaccharide that is at least one of an aqueous diutan gum solution, aqueous welan gum solution, or mixtures thereof.

25. The admixture of claim 23 wherein the viscosity modifying admixture comprises a cellulose that is at least one of a hydroxyethyl cellulose, hydroxypropyl cellulose, or mixtures thereof.

26. The admixture of claim 22 wherein the gas generating additive comprises a compound that generates nitrogen, oxygen, hydrogen, carbon dioxide, carbon monoxide, ammonia, or methane gas in the cementitious composition prior to setting.

27. A cementitious composition produced by the method of claim 15.

28. A method of delivering an admixture providing freeze-thaw resistance to a cementitious composition comprising adding to the cementitious composition a viscosity modifying admixture comprising a high molecular weight polymeric solution containing at least partially degradable polymeric particles, wherein the degradable polymeric particles comprise a degradable polymer that is at least one of polylactic acid, polyglycolic acid or copolymers, or mixtures thereof; and, wherein the viscosity modifying admixture containing the degradable polymer particles is added as a single admixture to the cementitious composition.

29. The method of claim 28 wherein the viscosity modifying admixture comprises at least one of celluloses, polyethylene glycols, polysaccharides, or mixtures thereof.

30. The method of claim 29 wherein the viscosity modifying admixture comprises a polysaccharide that is at least one of an aqueous diutan gum solution, aqueous welan gum solution, or mixtures thereof.

31. The method of claim 29 wherein the viscosity modifying admixture comprises a cellulose that is at least one of a hydroxyethyl cellulose, hydroxypropyl cellulose, or mixtures thereof.

32. The method of claim 28 wherein the degradable polymer particles comprise a degradable copolymer that is at least one of polylactic acid-polyglycolic acid, lactide-caprolactone, lactide-ethylene oxide, lactide-cyclic carbonate, lactide derived poly(ester amides), poly(L-lactide-co-D-lactide), or mixtures thereof.

33. The method of claim 28 wherein the degradable polymeric particles comprise degradable polymeric microspheres.

34. The method of claim 33 wherein the degradable polymeric microspheres or the degradable polymeric particles degrade in the cementitious composition during set.

35. The method of claim 28 wherein the degradable polymeric particles—have an average diameter of about 100 μm or less, optionally about 10 μm or less.

36. A frost durability admixture comprising a viscosity modifying admixture comprising a high molecular weight polymeric solution containing at least partially degradable polymeric particles, wherein the degradable polymeric particles comprise a degradable polymer that is at least one of polylactic acid, polyglycolic acid or copolymers, or mixtures thereof.

37. The admixture of claim 36 wherein the viscosity modifying admixture comprises at least one of celluloses, polyethylene glycols, polysaccharides, or mixtures thereof.

38. The admixture of claim 37 wherein the viscosity modifying admixture comprises a polysaccharide that is at least one of an aqueous diutan gum solution, aqueous welan gum solution, or mixtures thereof.

39. The admixture of claim 37 wherein the viscosity modifying admixture comprises a cellulose that is at least one of a hydroxyethyl cellulose, hydroxypropyl cellulose, or mixtures thereof.

40. The admixture of claim 36 wherein the degradable polymer particles comprise a degradable copolymer that is at least one of polylactic acid-polyglycolic acid, lactide-caprolactone, lactide-ethylene oxide, lactide-cyclic carbonate, lactide derived poly(ester amides, poly(L-lactide-co-D-lactide), or mixtures thereof.

41. The admixture of claim 36 wherein the degradable polymeric particles comprise degradable polymeric microspheres.

42. The admixture of claim 41 wherein the degradable polymeric microspheres or the degradable polymeric particles degrade in the cementitious composition during set.

43. The admixture of claim 40 wherein the degradable polymeric particles—have an average diameter of about 100 μm or less, optionally about 10 μm or less.

44. A cementitious composition produced by the method of claim 28.

* * * * *